United States Patent [19]

Foucault et al.

[11] Patent Number: 4,688,318

[45] Date of Patent: Aug. 25, 1987

[54] METHOD OF PREPARING A JOINT FOR A TUBE

[75] Inventors: Joël Foucault, Blois; Alain Bonnargent, Montesson, both of France

[73] Assignee: Hydexco, Bezons, France

[21] Appl. No.: 597,255

[22] Filed: Apr. 6, 1984

[30] Foreign Application Priority Data

Apr. 11, 1984 [FR] France .............................. 83 05872

[51] Int. Cl.⁴ ...................... B21D 39/00; B23P 11/00
[52] U.S. Cl. ........................................ 29/523; 29/237; 29/512; 285/382.5; 285/353; 285/354
[58] Field of Search ..................... 285/353, 354, 382.4, 285/382.5, 384, 386; 29/726, 727, 157 R, 157.3 C, 522 R, 523, 237, 512

[56] References Cited

U.S. PATENT DOCUMENTS

| | | |
|---|---|---|
| 2,477,676 | 8/1949 | Woodling . |
| 2,685,461 | 8/1954 | Mueller . |
| 2,857,666 | 10/1958 | Beyer . |
| 3,188,733 | 6/1965 | Rickard . |
| 3,467,414 | 9/1969 | Downing . |
| 3,484,123 | 12/1969 | Van Der Velden ......... 285/382.5 X |
| 3,711,132 | 1/1973 | Nickerson . |
| 3,730,567 | 5/1973 | Webster . |
| 3,778,090 | 12/1973 | Tobin .................................. 29/523 X |
| 4,043,160 | 8/1977 | Baker et al. ............................ 29/523 |
| 4,130,932 | 12/1978 | Epmeier . |
| 4,147,385 | 4/1979 | Van Der Velden . |
| 4,390,303 | 6/1983 | Mallet .............................. 29/523 X |

FOREIGN PATENT DOCUMENTS

| | | |
|---|---|---|
| 683803 | 9/1966 | Belgium ......................... 285/382.4 |
| 192072 | 11/1907 | Fed. Rep. of Germany . |
| 540825 | 1/1932 | Fed. Rep. of Germany . |
| 1022061 | 1/1958 | Fed. Rep. of Germany . |
| 1064906 | 5/1954 | France . |
| 2437560 | 4/1960 | France . |
| 0081781 | 9/1963 | France . |
| 1536521 | 8/1968 | France . |
| 2171718 | 9/1971 | France . |
| 2303981 | 10/1976 | France . |
| 2412778 | 7/1979 | France . |
| 0680620 | 1/1965 | Italy . |
| 2024973 | 1/1980 | United Kingdom . |

Primary Examiner—Charlie T. Moon
Attorney, Agent, or Firm—Sandler & Greenblum

[57] ABSTRACT

A method and apparatus are provided for joining tubes. The tubes have ends which are deformed within sleeves having an interior channel by applying pressure to the tube end portion, a mandrel being temporarily placed within the tube and sockets being fitted on the exterior of the tube, pressure being applied to the end portion of the tube to cause the wall of said tube to deform in the area of the sleeve channels to anchor the tube in the sleeve. After the mandrel and the sockets are removed, the sleeve is clamped in the joint member with a nut which is screwed onto it.

6 Claims, 17 Drawing Figures

METHOD OF PREPARING A JOINT FOR A TUBE

BACKGROUND OF INVENTION

1. Field of Invention

The invention relates to tube joints. It concerns in particular joints for tubes having a small diameter and/or a thin wall, such as are used for distributing fuel in aircraft or automobile engines.

2. Discussion of Prior Art

Generally, for the purpose of forming such a joint, the outer end of the tube to be joined is first provided with a cylindrical sleeve which can be anchored on said end, after which the sleeve is pressed into a joint member with a nut which is screwed on to the latter. It is essential that the anchoring of the sleeve on the tube should not cause the formation of lines or zones or reduced strength, particularly if the tube is of small wall-thickness. The process that seems to have met these technical anchoring requirements the most satisfactorily comprises the expansion of the end of the tube within the sleeve. The expansion process is very old and consists in introducing, into the tube, a mandrel of variable diameter so as to cause radial internal pressure which urges the tube against the inner wall of the sleeve which is provided with ribs and channels. In this method, an axially compressible mandrel is introduced into the tube, and then, with the help of a suitable system, the circumference of the mandrel is caused to expand in the zone of the channels in the sleeve, and the wall of the tube is thus radially pressed towards the bottoms of said channels. Then, after this interior shaping of the tube has been completed, the compression force is relaxed and the mandrel is withdrawn. The tube remains anchored in its sleeve and can then be connected in the usual manner by means of a joint member and a nut which can be screwed on to it.

The sleeves or sockets most frequently used are relatively long and for the purpose of achieving adequate anchoring, they comprise two spaced channels defining a separating rib and an end rib. Since the extent to which the tube can be deformed is limited, the presence of a plurality of ribs in the sleeve is necessary to ensure an adequate latching action.

Although this process has been generally satisfactory, it involves difficulties and has been found inadequate for reliably meeting technical requirements that are becoming progressively more stringent. In the first place, the compressible mandrel is fragile and breaks when used in tubes of small diameter, and the process is increasingly more difficult to use as the wall-thickness of the tube diminishes. In the zone of the ribs and channels of the sleeve, and consequently in the zone where the diameter is expanded, the tube is stretched radially and longitudinally, and the thickness of its wall therefore diminishes slightly, and this is noticeable in a tube having a very thin wall. The presence of the ribs causes folding of the material of the tube accompanied by the onset of lines of reduced strength which are aggravated when the sleeve is pressed into the joint member and into the clamping nut. Furthermore, due to the presence of two channels, the conventional excess thickness of a sleeve corresponds only to the central channel, and a thin zone corresponds to the end channel, and this zone is weak.

SUMMARY OF THE INVENTION

To overcome these difficulties, the Inventor has developed an anchoring process of the type consisting in deforming a tube within a sleeve having an interior channel, which process is characterized in that the deformation of the tube is achieved by the application of pressure to the end portion of its wall, a solid rigid mandrel having a smooth wall being temporarily placed within the tube, and preventing any inward deformation, and the pressure applied longitudinally at the end of such tube causing deformation by upsetting of the wall of the tube in the zone of the channel in the sleeve, in such manner that the sleeve and the tube are undetachably secured to each other.

To achieve deformation only in the zone of the channel or channels in the sleeve, the tube and optionally its sleeve, as well, are held in position on the outside by one or more sockets and/or shells, and on the inside by a mandrel of suitable diameter, so that the only zone of expansion is determined by the channel in the sleeve. In one embodiment of the method, the mandrel is introduced into the tube and at the same time pressure is applied to the end portion of the tube on completion of the stroke of the mandrel. For this purpose, the mandrel comprises a suitable shoulder for moving into abutment with the end portion of the tube and then applying pressure thereto. In another embodiment, the tube extends slightly beyond the sleeve, and the mandrel comprises two spaced shoulders so that when it is introduced into the tube, the first shoulder causes the tube to expand, and the second shoulder applies pressure to the end portion of the tube. In a still further embodiment of the invention, two mandrels are used in succession. The first mandrel comprises a single shoulder which is applied to the end section of the tube and serves only to apply the pressure necessary for effecting deformation in the zone of the channel or channels in the sleeve. During this operation, the portion of the tube that extends beyond the sleeve is held in position by a suitable socket. After the first mandrel has been retracted, a second mandrel having a single shoulder and a wider portion is introduced into the tube so as to expand the portion extending beyond the sleeve and to apply the deformed portion to the end of said sleeve.

The invention covers not only the process but the joint too. The sleeve used comprises a cylindrical bore without any internal ribs or other projections, but having a wide channel located at an externally thickened portion, preferably provided approximately midway along its length. Advantageously, the sleeve comprises a second channel within the first channel. This second channel is of smaller width, but has a greater diameter than that of the first channel. The second channel may be formed at any place in the bottom of the first channel, for example, along one edge of the first channel or at the middle thereof in such a way that a circular area of said first channel is present at each side of the second channel, thus defining the necessary anchoring and sealing shoulders. Where, in accordance with the process, the wall of the tube is seated in a sleeve having one channel, said wall has two circular attachment zones corresponding to the two shoulders defined by the channel within the sleeve. Where the wall of the tube is seated in a sleeve having a plurality of concentric channels, the wall of the tube comprises three or four circular attachment zones corresponding to the two or three shoulders defined by the two circular channels within the sleeve; the number of shoulders being dependent upon whether the second channel is or is not located at an end of the first channel. The expanded portion of the tube extends beyond the sleeve and the zone of deformation interconnecting the expanded and non-expanded portions is applied to the end of said sleeve, and this constitutes an additional shoulder and therefore an additional circular attachment zone.

After the end of the tube has been deformed, the mandrel and the sockets are withdrawn and the tube, seated in its sleeve, can then be connected with the aid of a joint member and of the nut screwed on to it.

BRIEF DESCRIPTION OF THE INVENTION

To enable the invention to be better understood, three embodiments will now be described by reference to the attached drawings, in which.

DESCRIPTION OF THE PREFERRED EMBODIMENTS

Figure 1:
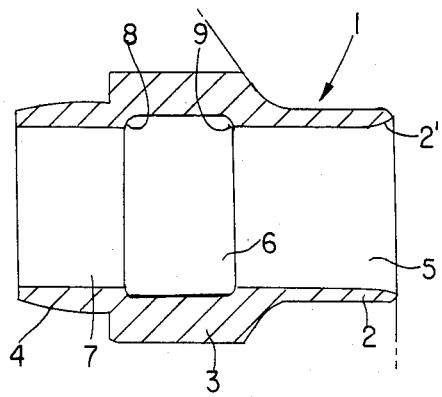
FIGS. 1 to 3 are sectional views through three sleeves in accordance with the invention.

FIG. 1 shows a section through a sleeve 1 which comprises, at one end, a tubular portion 2 with a flared mouth 2', at the centre, a thickened portion 3 and, at the other end, a tubular portion which is not flared but has an exterior slope which is preferably a part-spherical portion. The sleeve 1 comprises in its interior and from right to left a bore 5, a channel 6 and a further bore 7. The bores 5 and 7 are of the same diameter and are smooth-walled. The channel 6 has an appreciably greater diameter and a smooth cylindrical wall. The channel 6 also has shoulders 8 and 9 which face each other.

Figure 2:
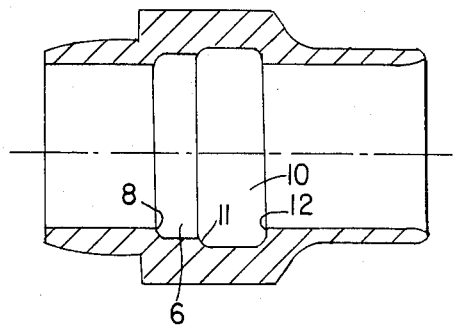

FIG. 2 illustrates a sleeve identical to that of FIG. 1 but with a second channel 10 concentric with the first channel 6 and comprising a shoulder 11 facing in the same direction as the shoulder 8 and a shoulder 12 instead of the shoulder 9 of FIG. 1 and more pronounced than the latter shoulder.

Figure 3:
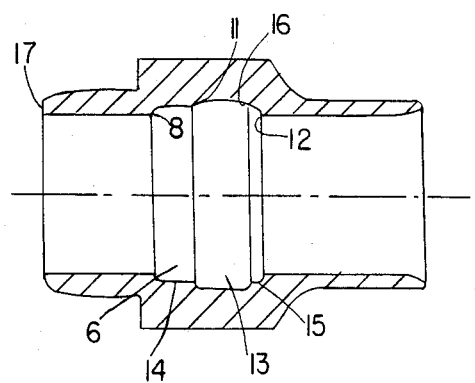
Figure 4:
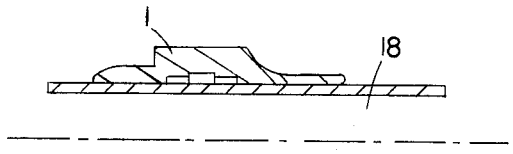
FIGS. 4 to 9 illustrate diagrammatically the successive phases of the process of flaring the tube in its sleeve.
Figure 5:
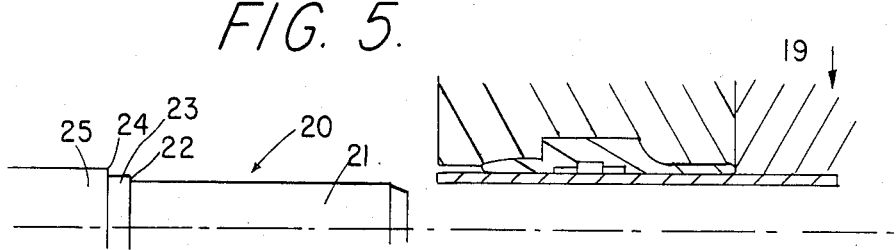
Figure 6:
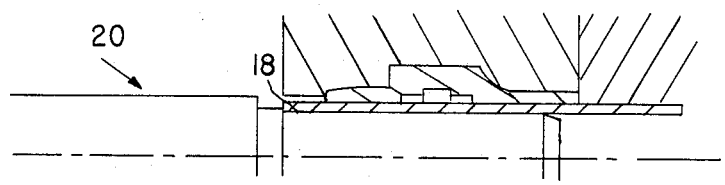
Figure 7:
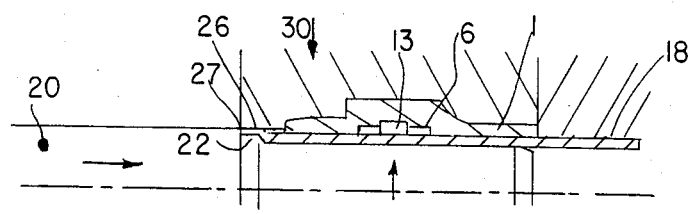
Figure 8:
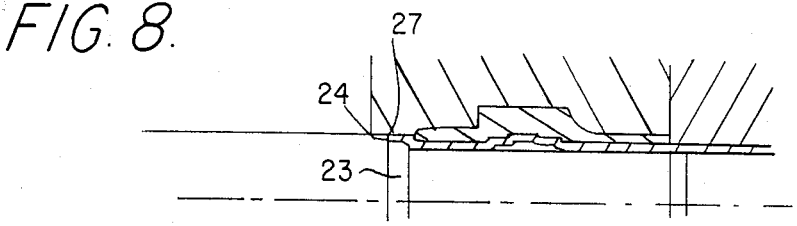
Figure 9:
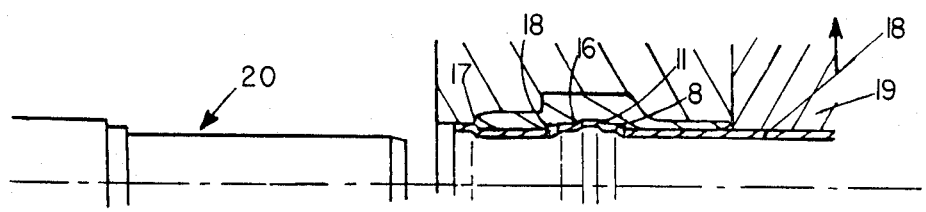
Figure 10:
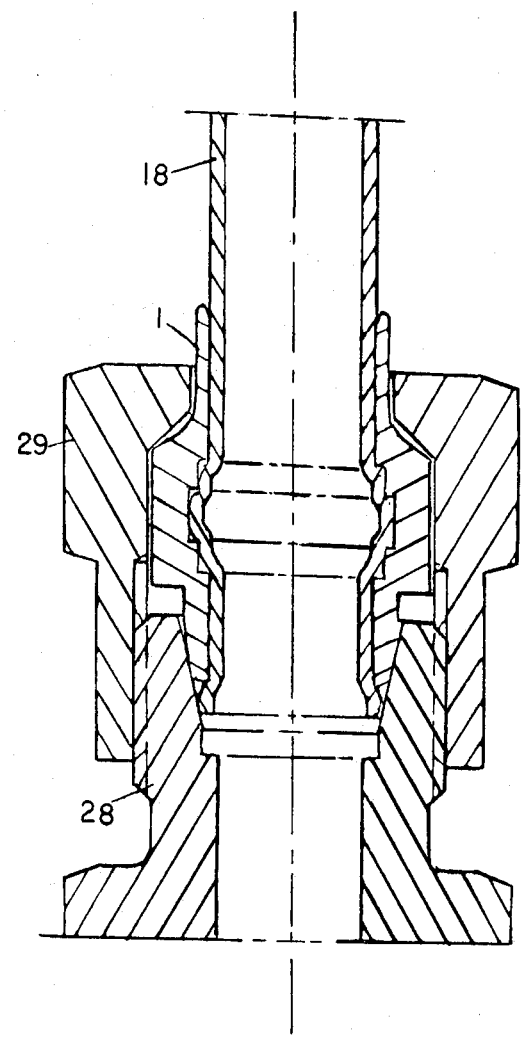
FIG. 10 shows a sectional view of the final joint.

FIG. 3 illustrates a sleeve identical to that shown in FIG. 1 but with a channel 13 concentric with the channel 6 and located midway along the sleeve so as to define areas 14 and 15, the sleeve also comprising shoulders 11 and 16. Thus, this sleeve has shoulders 8 and 11 facing in one direction, and shoulders 16 and 12 facing in the other direction. In addition to these four midway shoulders, the sleeve has an end 17 which also performs the function of a shoulder when the tube is expanded.

The method of seating is illustrated in FIGS. 4 to 9. The sleeve 1 is threaded over the tube 18 in such manner that the tube extends beyond the sleeve. A socket 19 is fitted on the tube to hold it in position, and shells 30 may be provided to support the sleeve 1. The sockets and shells prevent deformation of the tube at areas where this is not required. The mandrel 20 is solid and comprises three cylindrical portions 21, 23 and 25 of progressively increasing diameter which define shoulders 22 and 24. When the mandrel 20 is introduced into the tube 18, the portion 21 normally penetrates as far as the slightly inclined shoulder 22 so that the portion 23 in turn penetrates the interior of the tube 18 and expands it at 26 until its periphery 27 abuts the shoulder 24. As pressure continues and by the action of known means, the shoulder 24 applies very considerable pressure to the end portion 27 of the tube 18, the wall of which is pushed into the interior of the sleeve 1. Under this pressure, the tube 18 which is blocked in the socket 19 tends to deform only in the zone of the sleeve 1, and material of the tube passes into the channels 16 and 13 in the sleeve. As pressure continues, the wall of the tube 18 bears against the various channel shoulders. At the same time, the material of the tube builds up, and the wall tends to thicken rather than thin out as in the upsetting operation, and it also tends to harden, thus imparting to the end of the tube, treated in this way, a greater strength. Furthermore, the deformed portion 26 of the expanded zone of the tube 18 is applied to the end face 17 of the sleeve 1. After the mandrel 20 has been retracted, the tube 18 is clamped in the sleeve and has five anchoring points in relation to the shoulders 8, 11, 16, 18 and 17. Finally, the socket 19 is likewise removed.

The tube 18, provided with its sleeve 1, is placed in the joint member 28 on which the nut 29 is screwed. The expanded portion 26 of the tube 18 then extends beyond the sleeve 1 to an extent such that its end part comes into contact with the joint cone 28 so as to establish direct mechanical contact between the tube 18 and the joint member 28 and, possibly, an additional seal.

Figure 11:
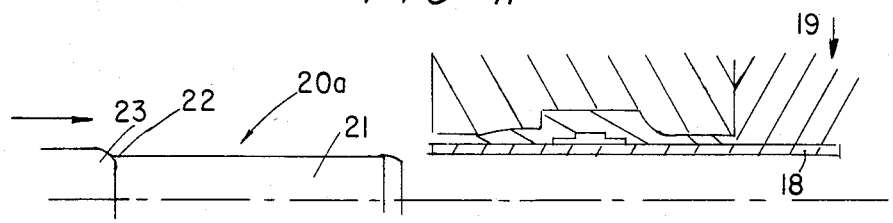
FIGS. 11-17 illustrate, diagrammatically, successive phases of flaring a tube in a sleeve using two different mandrels.
Figure 12:
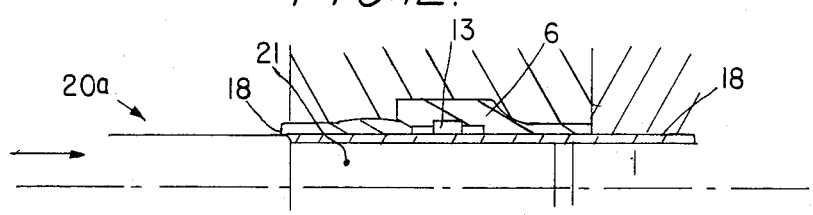
Figure 13:
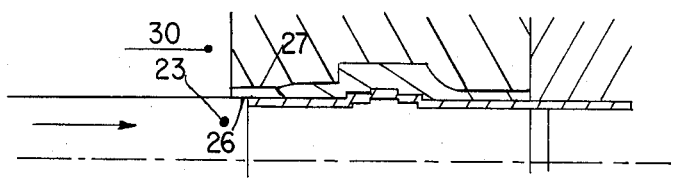

FIGS. 11-17 are similar to FIGS. 4-9 and illustrate the steps in a process of deforming a tube in a channel using two mandrels, one of which mandrels has a shoulder suitable for applying necessary pressure to the end portion of a tube so as to cause the tube to be deformed in at least one channel within a sleeve, while a second mandrel is used to expand the portion of the tube which extends beyond the sleeve so as to anchor it to the sleeve. Mandrel 20a is illustrated in FIG. 11, is solid, and is formed from two cylindrical portions 21 and 23 of different diameters which are separated by a generally cylindrical shoulder 22, as with mandrel 20 illustrated in FIGS. 5-8. Additionally, mandrel 20a is introduced to the interior of tube 18, such that the mandrel portion 21 extends into tube 18 and forces the inclined shoulder 22 just beyond the entrance of sleeve 19, as seen in FIG. 12, As in FIG. 13, end 26 of tube 18 will only partially deform into a flared configuration, and will be applied against shell member 30. Cylindrical shoulder 21 of mandrel 20a exerts an extremely strong force on the end section 27 of tube 18, which tube will then be forced into the interior channel of sleeve 1. Under this pressure, tube 18 is forced into the sleeve, and tends to deform in the middle of the sleeve, where it bunches-up and penetrates channels 6 and 13, which are most clearly illustrated in FIG. 12. Pressure continues to be exerted, and the tube will thereby conform to the interior of sleeve 18 without expansion of the tube.

Figure 14:
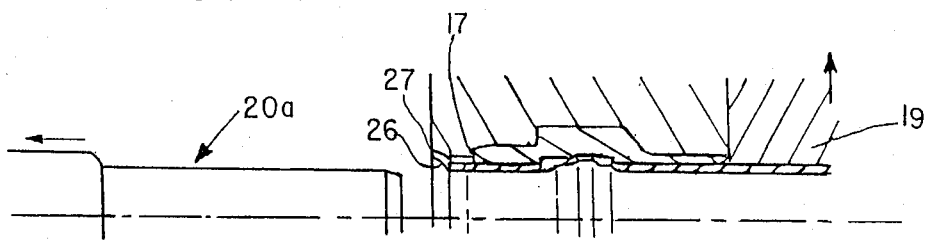
Figure 15:
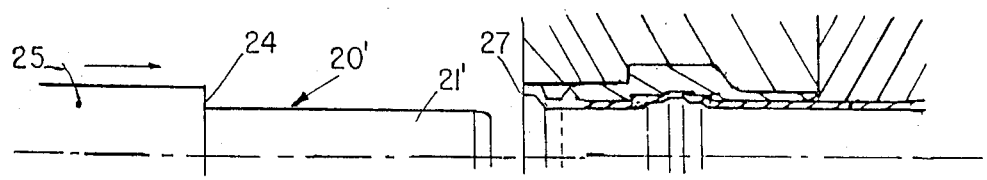
Figure 16:
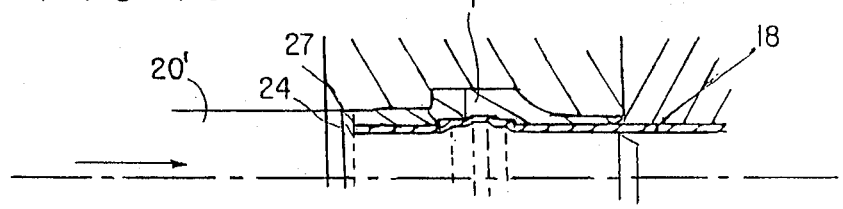
Figure 17:
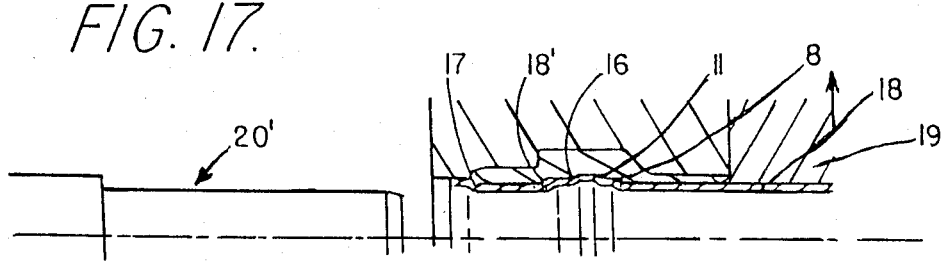

Mandrel 20a is then withdrawn, and a second, solid mandrel 20' is inserted, as illustrated in FIG. 14; mandrel 20' comprises two cylindrical portions 21' and 25 which are separated by a shoulder 24 similar to shoulder 22 of first mandrel 20a. Cylindrical portion 21' of mandrel 20' has approximately the same diameter, in section, as portion 21 of mandrel 20a, and is introduced similarly into the interior of tube 18, until shoulder 24 abuts end section 27 of the tube. The exterior of the tube is strengthened by crimping it against the corner of the sleeve and the socket, and the deformed end 26 of tube 18 is applied to end 17 of sleeve 1. After withdrawing mandrel 20', tube 18 thus remains securely within the sleeve at five anchoring points 8, 11, 16, 17, and 18', as best seen in FIG. 17. Thereafter, socket 19 and shell 30 are moved away from the sleeve and tubing.

Although intended for use in particular with tubes of small diameter and/or wall-thickness which are difficult to upset, the present invention can also be applied to other tubes. Also, the mandrels can be desigend for use with tubes of any cross-section.

We claim:

1. A method for preparing a joint for a tube comprising anchoring a sleeve at the end of said tube, deforming said tube within at least one channel located within the sleeve, said channel having a larger diameter than the remainder of the interior of said sleeve, so as to effect anchoring of said tube within said sleeve and thereafter inserting the tube assembly so formed into a joint member and screwing a nut onto said assembly, wherein said method of anchoring the sleeve on the end of the tube comprises positioning the sleeve on the tube together with a temporarily fitted retaining socket, deforming the tube in the said at least one channel of said sleeve by applying pressure to said tube end with a first, smooth mandrel comprising at least one shoulder, said mandrel being temporarily pushed into the interior of said tube so that the pressure applied by said shoulder to said one tube end occurs during one stroke of said mandrel so that the deformed portion of said tube assumes substantially the same shape as said at least one channel, wherein said tube has an interior wall at said at least one channel which has a diameter substantially different from the exterior diameter of a portion of said first mandrel immediately adjacent to said sleeve channel, thereafter withdrawing said mandrel and said socket from said sleeve, said sleeve thus being firmly set on said tube, said method further comprising using a second mandrel to expand a portion of the tube extending beyond the sleeve said first mandrel having a shoulder suitable for applying necessary pressure to the end portion of said tube so as to cause said tube to be deformed in at least said one channel.

2. A method according to claim 1 wherein said tube has a thin wall.

3. A method according to claim 1 wherein said tube includes a thickened portion.

4. A method according to claim 1 further comprising hardening the wall of the tube to impart additional strength to said tube.

5. A method for preparing a joint for a tube comprising anchoring a sleeve about said tube, deforming said tube within at least one channel within said sleeve so as to effect anchoring, wherein said tube assembly is positioned within a joint and nut assembly, said method of anchoring the sleeve on the end of the tube comprising positioning the sleeve over the tube with a temporarily fitted retaining socket, deforming the tube into said at least one channel of said sleeve by applying pressure to one end of said tube with a smooth mandrel comprising two shoulders, a first shoulder comprising means for expanding a portion of said tube which extends beyond said sleeve, a second shoulder comprising means for applying pressure to said one tube end, said mandrel being temporarily pushed into the interior of the tube so that the pressure applied by said second shoulder to said one tube end occurs during completion of one stroke of the mandrel, and so that the deformed portion of the tube assumes substantially the same shape as said at least one channel, thereafter withdrawing said mandrel and said socket from said sleeve, said sleeve thus being firmly set on said tube.

6. A method according to claim 5 wherein a mandrel comprising two shoulders is inserted in the tube extending beyond said sleeve so that said tube end extending beyond the sleeve is slightly expanded by a first shoulder having a diameter substantially similar to the internal diameter of said tube, said first shoulder being slightly bevelled and comprising means for penetrating said tube and for expanding said tube towards the interior of said sleeve, wherein said mandrel has a second shoulder with a diameter greater than the diameter of the interior of said tube and comprising means for exerting pressure on a first end of said tube, wherein pressure is applied to said one tube end by said second shoulder.

* * * * *